Sept. 24, 1968 L. R. LEDUC 3,402,775
SHANK HOLDERS WITH SPRING RELEASE FOR CULTIVATING IMPLEMENTS
Filed Dec. 30, 1965 2 Sheets-Sheet 1
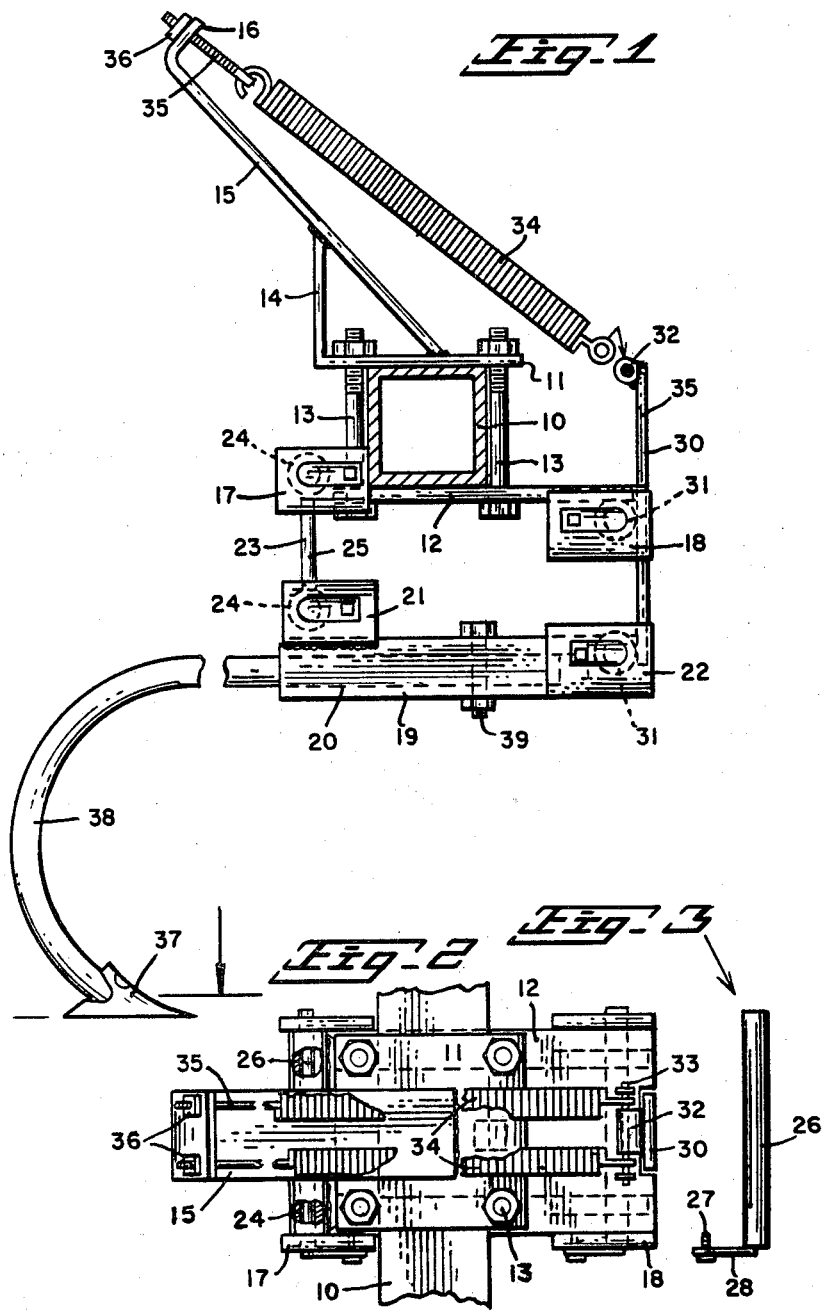
INVENTOR
Lucien R. Leduc
by
Agent

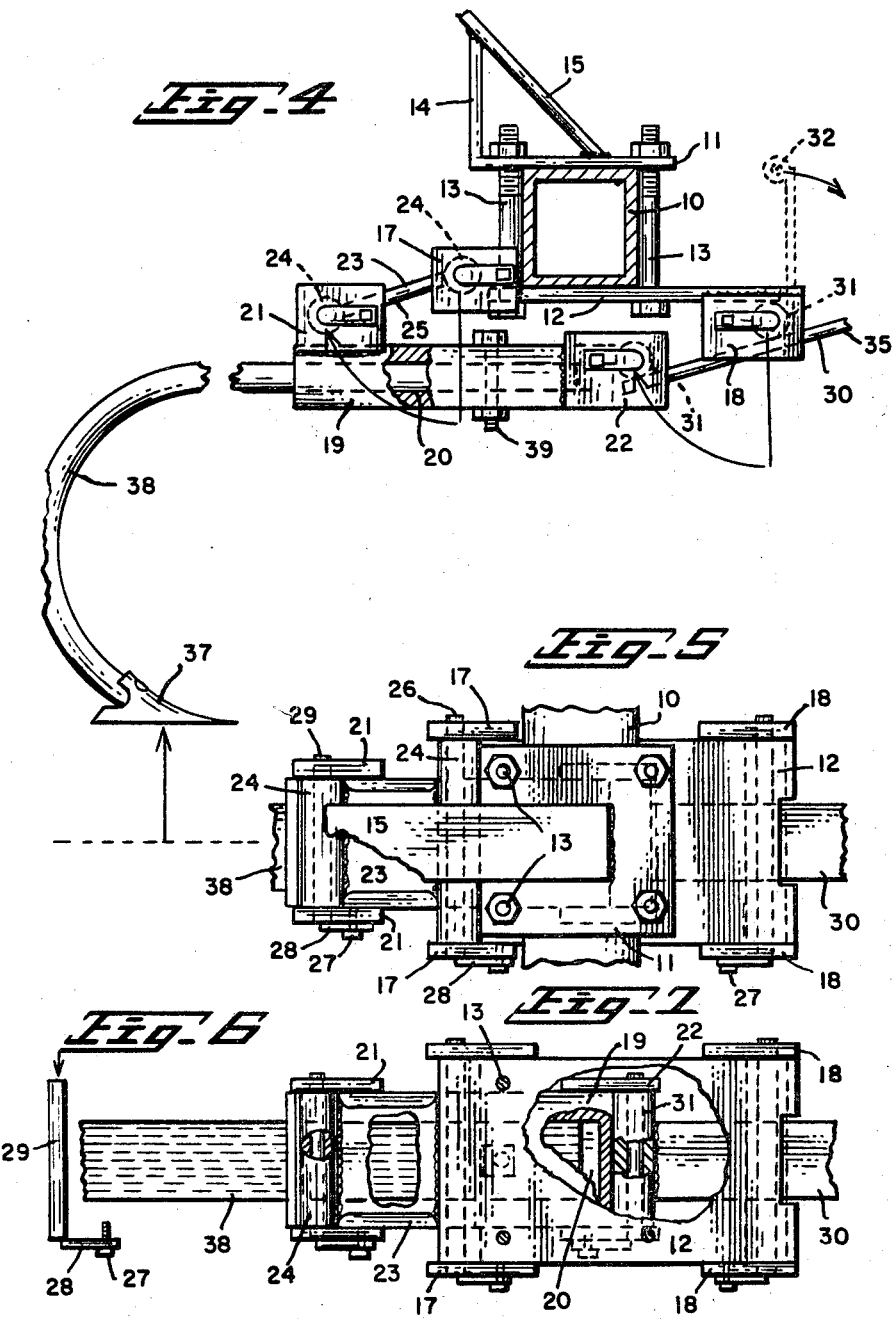

United States Patent Office 3,402,775
Patented Sept. 24, 1968

3,402,775
SHANK HOLDERS WITH SPRING RELEASE
FOR CULTIVATING IMPLEMENTS
Lucien Rene Leduc, Box 368, Assiniboia,
Saskatchewan, Canada
Filed Dec. 30, 1965, Ser. No. 518,765
4 Claims. (Cl. 172—705)

ABSTRACT OF THE DISCLOSURE

A parallel rule-shaped shank holder having the upper member thereof clamped under an implement cross bar, the lower member being a tubing for fastenably receiving the upper end of a tool shank, so said shank can be swung on the holder for tool raising and lowering without change of the tool angle; and one end link of the parallel rule extending upwardly to form a rocker bar therewith, and which is spring-connected to a stretch bar carried by the clamping means, for resiliently holding said rocker bar against one end of the clamped upper member.

Specification

This invention relates to shank holders for use in farm work, and particularly to tool carrying shanks which are adapted to swing back in a lifting movement, when the tools come in contact with imbedded stones, for passage thereover.

In present day cultivating machines of the above type, the cultivator shoes are carried by the bottom ends of the shanks, which are pivotally suspended from a cross bar of a wheel-supported frame, and the shanks normally hold the shoes to their work by the pressure or resilience of coil springs connected therewith. When the shoes strike imbedded stones, these shanks swing back and upward on the cross bar, against the resistance of the coil springs, which later return the shanks to position, after the shoes pass over said stones. In this rear upward swinging movement, the shoes take a forward tilting position, and if they are duckfoot shoes, which normally travel in a horizontal position through the ground, cutting a relatively wide weed swath therethrough, this tilting dips the pointed nose, while the rear wide-cutting side edges lift out of the ground too quickly, resulting in a V-shaped trench with uncut weeds on each side.

The principal object of the present invention is: to provide a shank holder which will resiliently hold the cultivator shoes to their work in the same manner as above described, but will rearwardly lift the shoes over resisting obstructions while maintaining them in a horizontal position, for maximum width of weed cut, until the shoes actually leave the ground.

Other features and advantages of the invention will become more apparent as the description proceeds, reference being had to the accompanying drawings wherein:

FIGURE 1 is a side view of a cultivator shank and holder attached to the cross bar of an implement frame, the cross bar being shown in cross section.

FIGURE 2 is a plan view of the shank holder of FIGURE 1, the springs being broken away to expose construction.

FIGURE 3 is a plan view of one of the hinge pins.

FIGURE 4 is a similar view to FIGURE 1 but showing the rear lifted position of the shank and shoe.

FIGURE 5 is a plan view of the holder shown in FIGURE 4, parts being broken away.

FIGURE 6 is a similar view to FIGURE 3.

FIGURE 7 is a similar view to FIGURE 5, but with the upper clamping plate and cross bar removed, and the lower clamping plate broken away to expose construction.

In the drawings like characters of reference indicate corresponding parts in the several figures.

The cross bar of a cultivator frame is indicated at 10, and is formed from a square tubing. A series of cultivator shank holders are adapted to be received on this cross bar in spaced relation therealong. As these holders are all standardized and comprise the invention now to be disclosed, only one will be described.

A pair of upper and lower clamping plates 11 and 12 respectively are received across the cross bar 10, and are secured thereon by four bolts 13, two of which pass down each side of the cross bar. The rear end of the plate 11 is bent upward in a standard 14, to support a stretch bar 15 which is angularly welded thereto, the lower end of the stretch bar being welded to the central part of the plate 11. The extreme upper end of the stretch bar is provided with a forwardly bent lug 16, for a purpose later explained.

The rear end of the lower clamping plate 12 carries a pair of plate brackets 17, one on each side thereof. These two brackets are welded to the plate 12 and they are positioned to project thereabove. The front end of the lower clamping plate projects some distance ahead of the cross bar 10, and is provided with a further pair of plate brackets 18, one on each side thereof, and each of which is welded thereto, and project therebelow.

A shank receiving boxing 19 of rectangular shape is horizontally and lengthwise positioned below the lower clamping plate 12, and in spaced relation therefrom. This boxing is narrower than the plate 12, is provided with a lengthwise pocket 20, and is also side provided with plate brackets 21 and 22 which are similar to those 17 and 18 on the above mentioned clamping plate 12.

A link 23 is formed from a pair of parallel cross tubings 24, which are spaced apart by a plate 25 to which they are welded. This link connects the rear end of the lower clamping plate 12 with the rear end of the boxing 19. The upper tubing 24 of the link is received between the brackets 17 and a pin 26, best shown in FIGURE 3, passes through the brackets and the tubing to form a hinge connection. A screw 27 passes through a lug 28 on one end of the pin and threads into one of the brackets 17, as a pin retainer. The same arrangement connects the lower end of the link with the brackets 21, but a shorter pin 29, shown in FIGURE 6, is used.

The front ends of the lower clamping plate 12 and the boxing 19 are similarly hinge-connected by the lower end of a rocker bar 30, which carries welded tubings 31, similar to those 24, and for the same purpose. The upper end of this rocker bar is welded to a short tube 32 to receive a bolt 33 therethrough. Each end of this latter bolt receives one of the eye ends of a pair of coil springs 34. The opposite ends of these springs are adjustably connected by eye bolts 35 and nuts 36 with the upper lug 16 of the stretch bar 15.

A duckfoot cultivator shoe 37 is shown on the lower curved end of a shank 38 in FIGURES 1 and 2. The upper end of this shank is straight and rectangular in cross section. This straight rectangular end is slidably received in the pocket 20 of the boxing 19, from the rear thereof and is secured therein by a vertical bolt 39, which passes centrally down through both.

As the link 23 and the rocker bar 30 are both pivotally mounted with the same spacing between their pivots, they form with the boxing 19 a parallelogram with the lower clamping plate 12, and they are held in the position shown in FIGURE 1 by the springs 34, which hold the upper lever end 35 of the rocker bar firmly against the front end of the lower clamping plate 12, and the cultivator shoe 37 in the working horizontal position shown in FIGURE 1.

As the frame (not shown) of the cultivating machine can be raised and lowered on its supporting wheels (not shown), the cross bar 10 can be so controlled to vary the depth of cut of the cultivator shoe 37. When this shoe encounters a buried stone which it cannot lift, as the machine passes over the ground, the reaction causes the shank 38 and the boxing 19 to swing back and up in the above parallelogram manner, against the resilience of the springs 34, as shown in FIGURE 4, thus withdrawing the shoe from the ground to pass over the obstruction. But, it will be seen that the shoe will remain horizontal and continue to cut weeds and the ground in a wide swath, until it leaves the ground surface. The springs 34 will return the shoe to the correct ground cutting depth, as the shoe clears the obstruction. Accordingly, the ground is fully tilled around such buried stones and the uncut weeds are reduced to a minimum.

What I claim as my invention is:

1. In combination with the cross bar of a farm implement frame; a tool shank holder therefor, comprising: a horizontal clamping plate secured to said cross bar; an elongated boxing suspended below said clamping plate, and linkage-connected therewith for a parallel retracting and elevating movement thereon; one of the links of said linkage extending upwardly and forming a rocker bar therewith; a pocket in the boxing for receiving and securing the upper end of a tool shank therein; an upwardly extending stretch bar mounted on the cross bar; and spring means between the upper end of the stretch bar and the extending end of said rocker bar for resiliently maintaining the boxing in a forward and lowered position on said linkage.

2. In combination with the cross bar of a cultivating machine; a shank holder therefor, comprising: an upper and a lower horizontal plate secured on said cross bar; means on said upper plate for supporting an upward extending stretch bar thereon; a rectangular boxing positioned in spaced relation below said lower plate; end links pivotally connecting the lower plate with the boxing for a retracting parallel rule movement of the boxing thereon; a pocket in the boxing for receiving and securing the upper end of a cultivator shank therein; an upward extension on one of said linkage means; spring means between the upper end of the stretch bar and said extension for resiliently maintaining the boxing in a forward position on the linkage; and means for adjusting the resiliency of said spring means.

3. In combination with the cross bar of a soil cultivating machine; a shank holder therefor, comprising: a lower horizontal plate positioned below and across said cross bar and clamp-secured to an upper angle plate on the cross bar; an upper rear-leaning stretch bar carried by the angle plate; a boxing longitudinally positioned below said lower plate; a link pivotally connecting the rear ends of the lower plate and the boxing; a rocker arm having its lower end pivotally connected to the front end of the boxing, and its central portion pivotally connected to the front of the lower plate, for a parallelogram rear lifting movement of the boxing on said lower plate, in conjunction with said link; a rectangular pocket in the boxing for receiving and securing the upper end of a cultivator shank therein; the upper end of said rocker arm presenting a lever; and spring means between the upper end of said stretch bar and said lever for resiliently maintaining the lever in stop contact with the front end of the lower plate.

4. A parallel rule tool shank holder as described in claim 2, wherein pivot pins are provided at the link connections, and said pins are each end provided with a side extending lug for screw fastening of said lugs to suitable parts of the holder and retention of said pins thereto.

References Cited

UNITED STATES PATENTS 3,219,128   11/1965   Van Der Lely _____ 172—711

FOREIGN PATENTS 647,375   8/1962   Canada.

ABRAHAM G. STONE, *Primary Examiner.*

S. PELLEGRINO, *Assistant Examiner.*